(12) United States Patent
Polaganga

(10) Patent No.: US 12,418,909 B2
(45) Date of Patent: *Sep. 16, 2025

(54) UPLINK AND DOWNLINK PRESCHEDULING IN FIXED WIRELESS ACCESS NETWORKS

(71) Applicant: T-Mobile USA, Inc., Bellevue, WA (US)

(72) Inventor: Roopesh Kumar Polaganga, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 386 days.

This patent is subject to a terminal disclaimer.

(21) Appl. No.: 18/177,709

(22) Filed: Mar. 2, 2023

(65) Prior Publication Data

US 2024/0292404 A1 Aug. 29, 2024

Related U.S. Application Data

(60) Provisional application No. 63/486,947, filed on Feb. 24, 2023.

(51) Int. Cl.
*H04W 72/121* (2023.01)
*H04W 28/02* (2009.01)
(Continued)

(52) U.S. Cl.
CPC ..... *H04W 72/121* (2013.01); *H04W 28/0284* (2013.01); *H04W 28/20* (2013.01); *H04W 72/52* (2023.01); *H04W 72/566* (2023.01)

(58) Field of Classification Search
CPC ........... H04W 72/121; H04W 28/0284; H04W 28/20; H04W 72/52; H04W 72/566
See application file for complete search history.

(56) References Cited

U.S. PATENT DOCUMENTS 6,741,579 B1 5/2004 Choi et al.
6,801,519 B1 10/2004 Mangal
(Continued)

FOREIGN PATENT DOCUMENTS

CN 102405681 B 6/2015
CN 104303542 B 10/2018
(Continued)

*Primary Examiner* — Austin J Moreau
(74) *Attorney, Agent, or Firm* — Perkins Coie LLP

(57) ABSTRACT

A base station receives a request from a fixed wireless access network for uplink and downlink prescheduling. Blind grants for uplink data are sent to multiple subscriber units. The fixed wireless access network implements dynamic scheduling of downlink data. The uplink data is received from the multiple subscriber units based on the blind grants. The downlink data is sent to the multiple subscriber units using dynamic scheduling. Presence of congestion on a physical uplink shared channel (PUSCH) or a physical downlink shared channel (PDSCH) of the fixed wireless access network is determined. The uplink and downlink prescheduling for a first one or more subscriber units is terminated. The first one or more subscriber units is associated with a first subscription tier. The uplink and downlink prescheduling is continued for a second one or more subscriber units associated with a second subscription tier higher than the first subscription tier.

20 Claims, 9 Drawing Sheets

(51) Int. Cl.
*H04W 28/20* (2009.01)
*H04W 72/52* (2023.01)
*H04W 72/566* (2023.01)

(56) References Cited

U.S. PATENT DOCUMENTS

| | | |
|---|---|---|
| 6,819,930 B1 | 11/2004 | Laroia et al. |
| 6,891,810 B2 | 5/2005 | Struhsaker et al. |
| 7,042,905 B1 | 5/2006 | Johnson |
| 7,173,916 B2 | 2/2007 | Struhsaker et al. |
| 7,230,931 B2 | 6/2007 | Struhsaker |
| 7,324,491 B1 | 1/2008 | Benveniste |
| 7,437,157 B1 | 10/2008 | Satapathy |
| 7,610,050 B2 | 10/2009 | Sayers et al. |
| 8,000,313 B1 | 8/2011 | Shah et al. |
| 8,184,658 B1 | 5/2012 | Chowdhuri et al. |
| 8,194,576 B2 | 6/2012 | Kholaif et al. |
| 8,259,687 B2 | 9/2012 | Foore et al. |
| 8,396,458 B2 | 3/2013 | Raleigh |
| 8,406,748 B2 | 3/2013 | Raleigh et al. |
| 8,467,397 B2 | 6/2013 | Lysejko et al. |
| 8,472,339 B2 | 6/2013 | Lysejko et al. |
| 9,270,559 B2 | 2/2016 | Raleigh et al. |
| 9,629,028 B2 | 4/2017 | Meylan et al. |
| 9,706,423 B2 | 7/2017 | Horn et al. |
| 9,749,898 B2 | 8/2017 | Raleigh et al. |
| 9,761,137 B2 | 9/2017 | Beaurepaire et al. |
| 9,820,302 B2 | 11/2017 | Choi et al. |
| 9,854,469 B2 | 12/2017 | Wang et al. |
| 10,499,451 B2 | 12/2019 | Tabet et al. |
| 2013/0132578 A1 | 5/2013 | Raleigh |
| 2013/0294247 A1* | 11/2013 | Zhu ............... H04W 72/52 370/235 |
| 2019/0090222 A1* | 3/2019 | Wu ............... H04W 72/20 |
| 2019/0380148 A1* | 12/2019 | Dudda ............ H04W 72/12 |
| 2023/0224059 A1* | 7/2023 | Parkvall ......... H04J 11/0079 370/321 |

FOREIGN PATENT DOCUMENTS

| | | |
|---|---|---|
| CN | 106714270 B | 10/2020 |
| CN | 107750473 B | 3/2021 |
| CN | 111869279 B | 2/2022 |
| CN | 111246488 B | 5/2023 |
| EP | 1550264 B1 | 9/2010 |

* cited by examiner

UPLINK AND DOWNLINK PRESCHEDULING IN FIXED WIRELESS ACCESS NETWORKS

CROSS-REFERENCE TO RELATED APPLICATION(S)

This application claims the benefit of U.S. Provisional Patent Application No. 63/486,947, entitled "UPLINK AND DOWNLINK PRESCHEDULING IN FIXED WIRELESS ACCESS NETWORKS" filed on Feb. 24, 2023, which is incorporated by reference herein in its entirety.

BACKGROUND

The adoption of fifth generation of mobile communications (5G) technology can boost mobile network capacities and enable network operators to provide services such as fixed wireless access. Fixed wireless access can be a cost-effective and efficient alternative for providing broadband compared to traditional cable-based solutions. 5G technology can also drive new consumer user cases such as extended reality, which lead to next-generation Internet offerings. Extended-reality traffic can result from both indoor applications having limited mobility as well as mobile traffic driven by augmented-reality wearable devices. There is thus a need for wireless operator-provided Wi-Fi solutions (such as fixed wireless access) as well as for wireless networks to flexibly support both indoor network usage and heavier mobile traffic having stringent latency and throughput requirements. However, conventional cellular and Internet networking is often unable to adjust to rapid changes in uplink and downlink data rates while meeting strict latency requirements.

BRIEF DESCRIPTION OF THE DRAWINGS

Detailed descriptions of implementations of the present technology will be described and explained through the use of the accompanying drawings.

Figure 1:
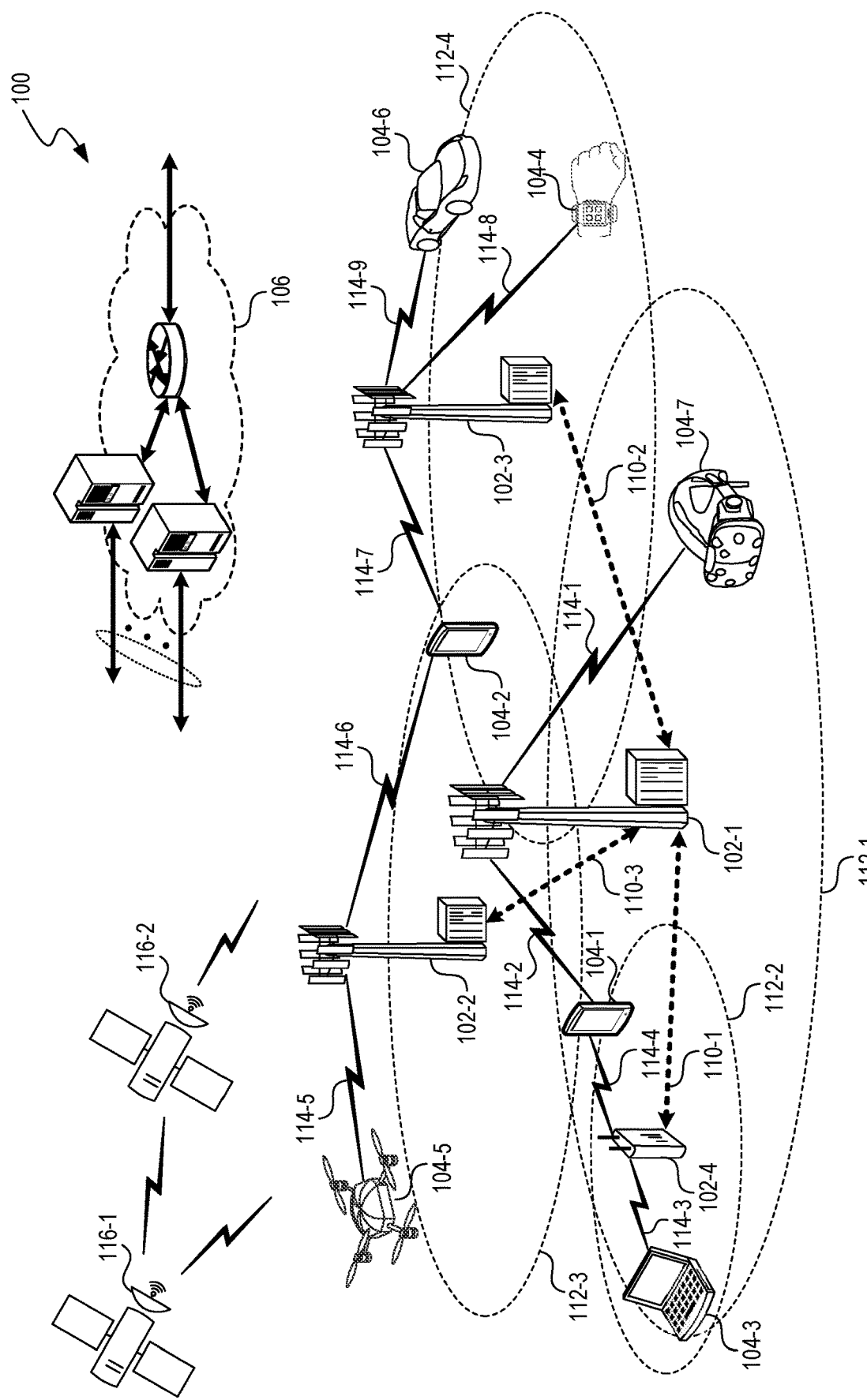
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Fixed wireless access is a wireless technology that enables broadband access using radio frequencies instead of cable. A fixed wireless access network implements 5G or 4G LTE wireless technology to enable fixed broadband access using radio frequencies. In a fixed wireless access network system, radio waves are used to send high-speed signals that offer data transfer to and from consumer devices such as subscriber units and user devices. Fixed wireless access can be used to connect homes and businesses to the Internet. A fixed wireless access system includes a base station connected to a fixed network and a number of subscriber units spread out over a wide area. Base stations providing fixed wireless access connectivity are strategically attached to stationary structures such as poles, buildings or towers. A base station uses radio waves to communicate with the subscriber units, making it possible for consumers to connect to the fixed network and access high-speed data services. Transmitters are strategically attached to stationary structures such as poles, buildings, or towers. New consumer user cases such as extended reality that are gaining in popularity result in traffic from both indoor applications having limited mobility as well as mobile traffic driven by augmented-reality wearable devices. Existing solutions are unable to accommodate such use cases because conventional technologies are unable to rapidly reconfigure networks to switch between supporting upload-heavy applications, download-heavy applications, and low-latency applications. There is thus a need for wireless operator-provided Wi-Fi solutions (such as fixed wireless access) as well as for wireless networks to flexibly support both indoor network usage and heavier mobile traffic having stringent latency and throughput requirements.

This specification discloses methods, systems, and apparatuses for uplink and downlink prescheduling in fixed wireless access networks to address the challenges posed by 5G technology and extended-reality applications. Extended-reality applications can include virtual-reality use cases and augmented-reality use cases. Extended-reality technology combines or mirrors the physical world with a "digital twin world" that are able to interact with each other. Virtual-reality applications offer a simulated experience that employs pose tracking and three-dimensional (3D) near-eye displays to give a user an immersive feel of a virtual world. Augmented-reality applications provide an interactive experience that combines the real world and computer-generated content, spanning multiple sensory modalities, including visual, auditory, haptic, somatosensory and olfactory content.

To reconfigure a fixed wireless access network to support upload-heavy applications such as augmented-reality applications, a base station initiates uplink prescheduling for augmented-reality devices on a fixed wireless access network. To pre-allocate network resources for data uploads, the base station transmits blind grants to the augmented-reality devices. A conventional grant refers to physical control channel information permitting a user device to upload a portion of uplink data to a network in response to receiving a service request from the user device. In contrast, a blind grant proactively enables the user device or a subscriber unit to indefinitely upload data without pausing to send a service request for each portion of the uplink data. Blind grants obviate the need for each user device to submit multiple requests for resources. Uplink data can include biometric data captured by the augmented-reality devices. While receiving the uplink data based on the blind grants, the base station determines presence of congestion on a physical uplink shared channel (PUSCH) of the fixed wireless access network. To reconfigure the network resources in response to determining the presence of congestion, the base station terminates transmitting blind grants to a first set of subscriber units on the network. The first set of subscriber units is associated with a first subscription tier, which has a lower priority. The base station continues transmitting blind grants to a second set of subscriber units associated with a second subscription tier, which has a higher priority than the first subscription tier, such that uploads by the second set of subscriber units are not interrupted.

In some example scenarios, to reconfigure a fixed wireless access network to support download-heavy applications such as video streaming, a base station receives a request for downlink prescheduling from at least one subscriber unit on the fixed wireless access network. In response, the base station configures the fixed wireless access network to implement dynamic scheduling of downlink data, and begins transmitting the downlink data to multiple subscriber units on the network. The downloads are performed such that a downlink latency experienced by user devices connected to the subscriber units is less than a threshold latency. In response to determining presence of physical uplink shared channel PDSCH congestion in the fixed wireless access network, the base station determines whether the subscriber units are associated with a subscription tier specifying the threshold latency. If the subscriber units belong to a subscription tier specifying the threshold latency, dynamic scheduling is continued for the subscriber units. If the base station determines that the downlink data has exceeded a data cap specified by the subscription tier, dynamic scheduling is terminated for the subscriber units.

To support the low-latencies required by higher-performance applications such as online gaming, both uplink and downlink bandwidths for subscriber units and user devices are temporarily boosted. For example, a base station supporting online gamers receives a request from a fixed wireless access network for uplink and downlink prescheduling seeking a boost in the bandwidths for both uplink and downlink. The base station transmits blind grants for uplink data to multiple subscriber units on the fixed wireless access network. The blind uplink grants reduce the uplink latency for applications such as augmented-reality applications operating on mobile devices. Further, to reduce a downlink latency for applications such as video streaming or online gaming operating on devices within a home or office, the base station configures the fixed wireless access network to implement dynamic scheduling of downlink data for the multiple subscriber units. For example, the base station transmits a downlink control information (DCI) scheduling grant per each physical downlink shared channel (PDSCH) message to the multiple subscriber units. In this manner, uplink latency is reduced because the base station receives the uplink data based on the blind grants. Similarly, the base station reduces downlink latency by sending the downlink data from a backhaul of the fixed wireless access network to the devices using dynamic scheduling.

The benefits and advantages of the implementations described herein include an improved end user experience compared to conventional networking methods. Network devices can set desired modes of operation in accordance with their usage and/or subscription tiers, enabling the mobile and broadband network to accommodate and prioritize heavier loads. The implementations provided herein adjust uplink and downlink data rates in accordance with traffic and network characteristics (e.g., latency), such that applications requiring high bandwidth, higher throughout, higher performance, etc. (e.g., video streaming and online gaming experiences) are improved compared to when they are executed using conventional networking methods.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented-reality/virtual-reality connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink transmissions from a wireless device 104 to a base station 102, and/or downlink transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, augmented reality/virtual reality, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
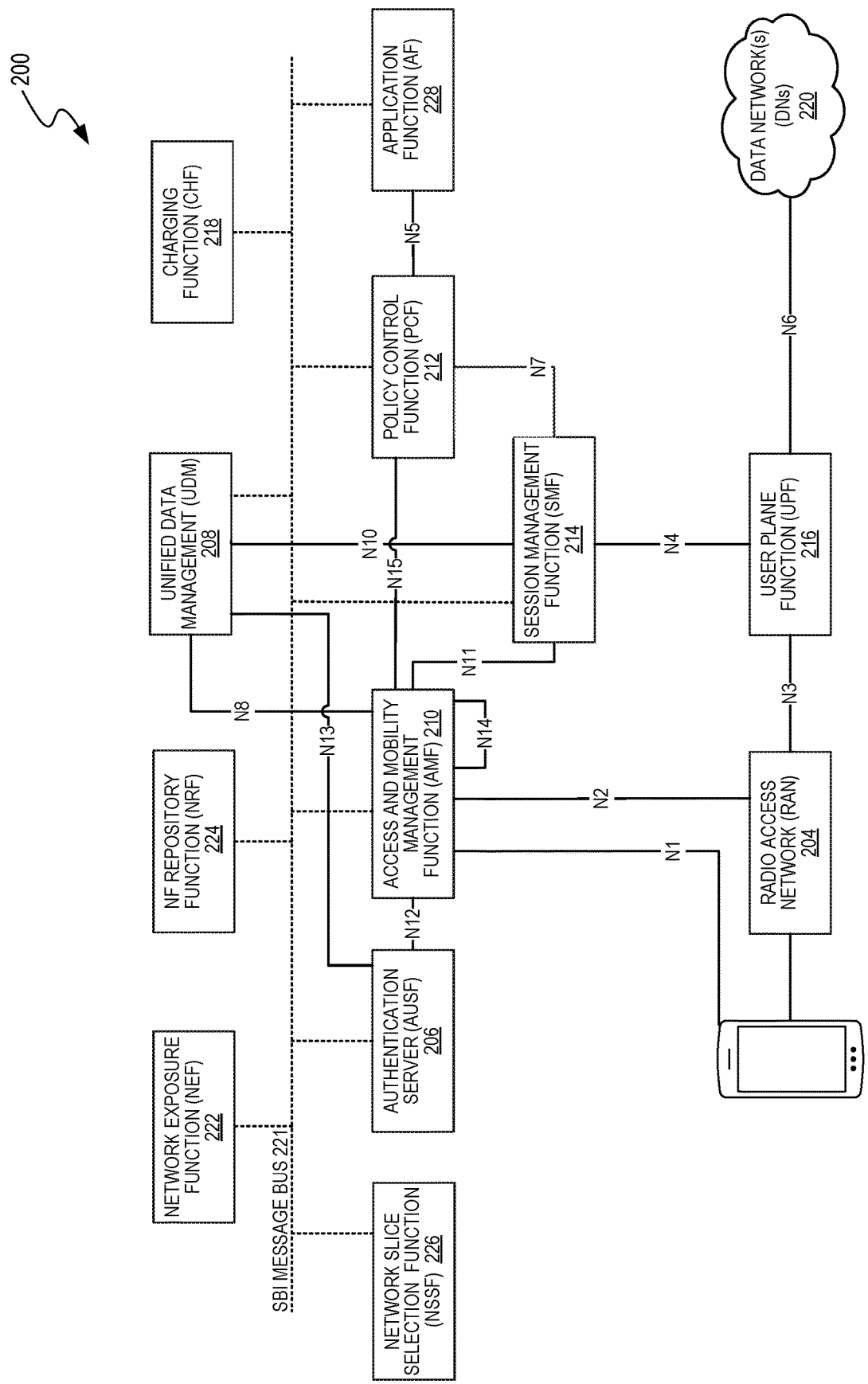
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Uplink and Downlink Prescheduling in Fixed Wireless Access Networks

Figure 3:
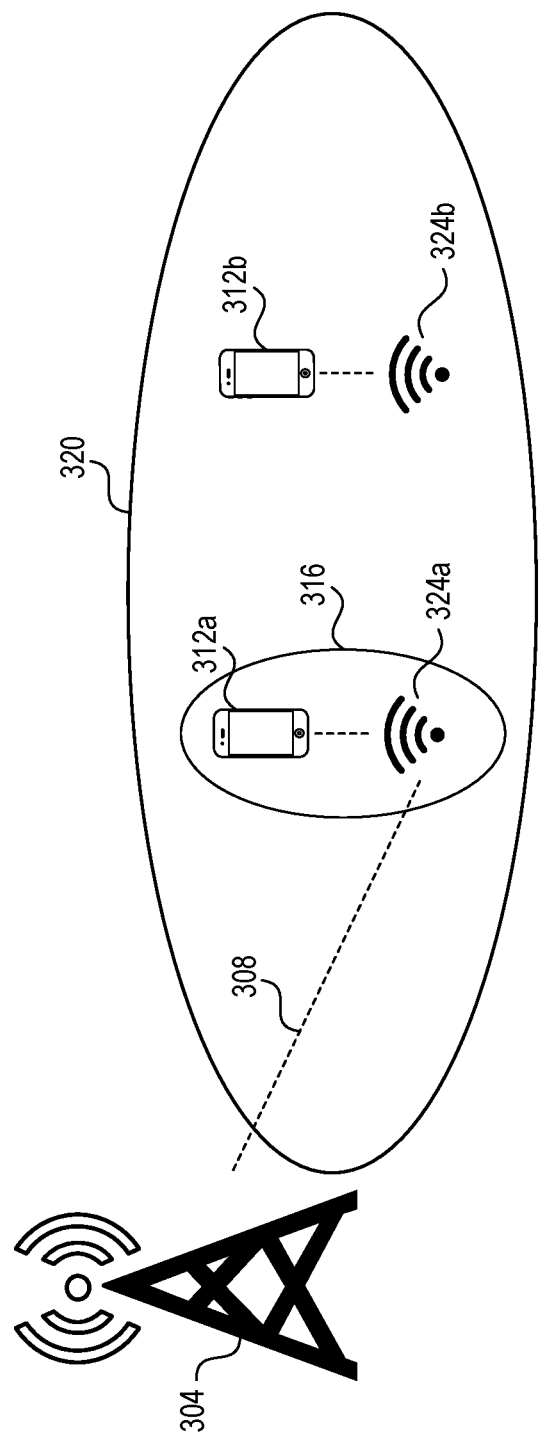
FIG. 3 is a drawing that illustrates an example system for uplink and downlink prescheduling in fixed wireless access networks.

FIG. 3 is a drawing that illustrates an example system according to some implementations of the disclosed technology for uplink and downlink prescheduling in a fixed wireless access network 308. The system includes base station 304, subscriber units 324a, 324b, and user devices 312a, 312b connected by fixed wireless access network 308. Base station 304 is the same as or similar to the example base stations 102-1 through 102-4 illustrated and described in more detail with reference to FIG. 1. For example, base station 304 is a 5G gNodeB implementing a software defined radio. Subscriber unit 324 is a wireless router, a gateway, modem, another fixed wireless access device, or a combination thereof. User devices 312a, 312b are the same as or similar to the example wireless devices 104 illustrated and described in more detail with reference to FIG. 1. Likewise, implementations of the system can include different and/or additional components, or be connected in different ways.

Fixed wireless access network 308 is part of the example network 100 illustrated and described in more detail with reference to FIG. 1. Fixed wireless access network 308 is used to connect homes (e.g., subscriber unit 324) and/or businesses to the Internet. Radio waves are used to send high-speed signals that offer data transfer to and from consumer devices (e.g., subscriber units 324a, 324b, and user devices 312a, 312b). The fixed wireless access system shown by FIG. 3 includes base station 304 connected via fixed wireless access network 308 to subscriber units 324a, 324b that can be spread out over a wide area 320. For example, user device 312a accesses fixed wireless access network 308 using Wi-Fi or wired connectivity provided by subscriber unit 324a across a home or business (e.g., area 316).

To support both indoor network usage and mobile traffic having the stringent latency and throughput requirements of virtual-reality and augmented-reality applications, as well as online gaming and video streaming, base station 304 can flexibly reconfigure fixed wireless access network 308 and the connectivity of subscriber units 324a, 324b to fixed wireless access network 308. In some implementations, base station 304, receives a request from fixed wireless access network 308 for uplink and downlink prescheduling. Base station 304 can initiate uplink prescheduling and downlink prescheduling for one or more extended-reality devices (e.g., user devices 312a, 312b) connected to fixed wireless access network 308. Extended-reality devices include, but are not limited to, headsets, head-mounted displays, smartphone/tablet-based devices, smart glasses, and/or other augmented-reality devices, virtual-reality devices, and/or mixed-reality devices. An example head-mounted display with wireless augmented-reality/virtual-reality connectivity 104-7 is illustrated and described in more detail with reference to FIG. 1. The uplink and downlink prescheduling can specify a quality of service indicator specified by the fixed wireless access network. In some implementations, the 5QI quality of service indicator is a 5G quality of service indicator. The request for uplink and downlink prescheduling can specify the quality of service indicator. The 5QI quality of service indicator is described in more detail with reference to FIG. 6.

Prescheduling refers to base station 304 allocating physical uplink shared channel (PUSCH) resources for subscriber units 324a, 324b, and user devices 312a, 312b in advance without receiving any scheduling requests (SRs) or buffer status reports (BSRs). An example SR 416 and an example BSR are illustrated and described in more detail with reference to FIG. 4. As a result of prescheduling, latencies for subscriber units 324a, 324b, and user devices 312a, 312b are reduced when data transmission begins because no additional signaling is needed for PUSCH allocation, which could reduce download time.

To proactively allocate network resources and obviate the need for repeated requests to upload data, base station 304 transmits blind grants for uplink data to subscriber units 324a, 324b on fixed wireless access network 308. Example blind grants 420 are illustrated and described in more detail with reference to FIG. 4. A frequency of transmitting the blind grants can be based on the quality of service indicator. In some examples, the one or more extended-reality devices are executing an augmented-reality application, and the uplink data includes video or biometric data captured by the extended-reality devices.

Base station 304 can configure fixed wireless access network 308 to implement dynamic scheduling of downlink data for subscriber units 324a, 324b. For example, dynamic scheduling is configured for the one or more extended-reality devices. When dynamic scheduling is performed, subscriber units 324a, 324b receive scheduling assignments/grants in each subframe. As a result, fixed wireless access network 308 can be more flexible in assigning resources to subscriber units 324a, 324b by transmitting resource allocation information on the physical downlink control channel (PDCCH) in each subframe. The PDCCH is primarily used to carry scheduling information to subscriber units 324a, 324b, e.g., resource assignments for uplink and downlink data and control information. An additional benefit of dynamic scheduling is flexibility of varying resource allocation based on reported channel conditions.

Base station 304 receives uplink data from subscriber units 324a, 324b based on the blind grants. Base station 304 transmits downlink data from a backhaul of fixed wireless access network 308 to subscriber units 324a, 324b (and downstream to the one or more extended-reality devices) using dynamic scheduling. Transmitting the downlink data from the backhaul to the one or more extended-reality devices can be in accordance with the quality of service indicator. The backhaul connects base station 304 to the core network 200 illustrated and described in more detail with reference to FIG. 2. Example backhaul links 110-1 through 110-3 are illustrated and described in more detail with reference to FIG. 1. As a result of the uplink and downlink prescheduling, a uplink latency experienced by user devices 312a, 312b (e.g., for augmented-reality applications) is less than a threshold uplink latency. The threshold uplink latency can be specified by a user's subscription tier. For example, the threshold uplink latency is 10 milliseconds (ms), 20 ms, or 30 ms. The downlink latency experienced (e.g., for video streaming or online gaming) is less than a threshold downlink latency. The threshold downlink latency can be specified by a user's subscription tier. For example, the threshold downlink latency is 10 ms, 20 ms, or 30 ms. The downlink latency can be the same as or different from the uplink latency. The downlink threshold latency can be the same as or different from the uplink threshold latency.

As a result of the uplink and downlink prescheduling, an uplink bandwidth available to user devices 312a, 312b (e.g., for augmented-reality applications) is greater than a threshold uplink bandwidth. The threshold uplink bandwidth can be specified by a user's subscription tier. For example, the threshold uplink bandwidth is 1 gigabit per second (Gbps), 2 Gbps, or 3 Gbps. The downlink bandwidth available (e.g., for video streaming or online gaming) is greater than a threshold downlink bandwidth. The threshold downlink bandwidth can be specified by a user's subscription tier. For example, the threshold downlink bandwidth is 1 Gbps, 2 Gbps, or 3 Gbps. The downlink bandwidth can be the same as or different from the uplink bandwidth. The downlink threshold bandwidth can be the same as or different from the uplink threshold bandwidth.

In an example scenario, base station 304 determines presence of congestion on the PUSCH or PDSCH of fixed wireless access network 308. Responsive to determining the presence of congestion, base station 304 can terminate either uplink or downlink prescheduling or both for a first one or more subscriber units (e.g., subscriber unit 324a). Subscriber unit 324a is associated with a first subscription tier, e.g., having a lower priority or specifying a lower threshold uplink/downlink bandwidth. Base station 304 continues uplink and downlink prescheduling for a second one or more subscriber units (e.g., subscriber unit 324b) because subscriber unit 324b is associated with a second subscription tier that is higher than the first subscription tier. For example, the second subscription tier specifies higher threshold bandwidths and/or lower threshold latencies.

In some implementations, each subscription tier specifies a data cap. For example, a data cap (also referred to as a "data bucket") of 50 Gigabyte (GB) high-priority data is specified to accommodate applications such as extended-reality applications, video streaming, or online gaming. The data caps can be application-specific, for example, a 20 GB data cap for high-priority uplink data, a 30 GB data cap for high-priority downlink data, or a 40 GB data cap for high-priority low-latency data are specified separately by subscription tiers.

Base station 304 determines that the downlink data has exceeded a data cap associated with the one or more extended-reality devices on fixed wireless access network 308 using a 5G core (5GC) policy control function (PCF) that monitors policy rules for control plane functions. In response to determining that the downlink data has exceeded the data cap, dynamic scheduling is terminated for the one or more extended-reality devices. Priority data cap expiry determination is based on a user's subscription plan. The 5G core (5GC) network functions 200 (illustrated and described in more detail with reference to FIG. 2) can track data usage based on the user's subscription. For example, the example Policy Control Function (PCF) 212 provides and monitors policy rules for control plane functions, including network slicing, roaming, and mobility management. Networking slicing and an example Network Slice Selection Function (NSSF) 226 are illustrated and described in more detail with reference to FIG. 2.

Figure 4:
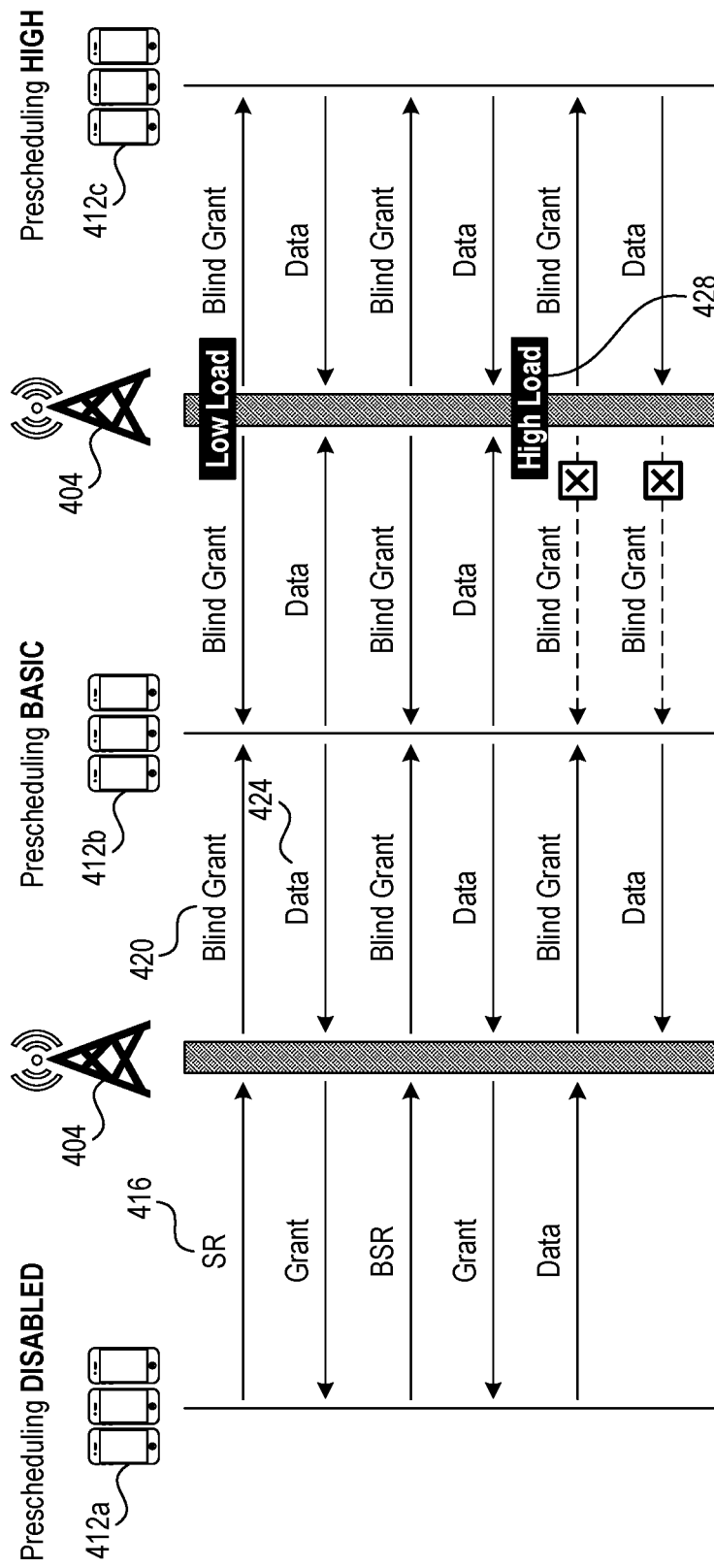
FIG. 4 is a drawing that illustrates an example flow for uplink prescheduling in fixed wireless access networks.

FIG. 4 is a drawing that illustrates an example flow for uplink prescheduling in fixed wireless access networks. In some implementations, the flow is performed by base station 404, which is similar to or the same as base station 304 illustrated and described in more detail with reference to FIG. 3. Base station 404 flexibly reconfigures uplink connectivity to a fixed wireless access network for subscriber units and/or user devices 412a-c, which are similar to or the same as user devices 312a, 312b illustrated and described in more detail with reference to FIG. 3. Example subscriber units 324a, 324b and an example fixed wireless access network 308 are illustrated and described in more detail with reference to FIG. 3. Steps of the flow can also be performed by elements of the 5G core illustrated and described in more detail with reference to FIG. 2 or by the computer system 900 illustrated and described in more detail with reference to FIG. 9. Likewise, implementations of the flow can include different and/or additional steps, or perform the steps in different orders.

Base station 404 implements a fixed wireless access network that user devices 412a can connect to. Prescheduling is disabled or not performed for user devices 412a associated with a lower subscription tier (e.g., Tier 1). When prescheduling is disabled or not performed, subscriber units and/or user devices 412a that wish to upload a portion of uplink data send service requests (e.g., SR 416) to base station 404. The service requests can be sent to base station 404 directly by user devices 412a, directly by subscriber units connected to user devices 412a, or by user devices 412a via subscriber units.

In response, base station 404 sends grants to the subscriber units and/or user devices 412a. Grants can be sent directly to user devices 412a or subscriber units that user devices 412a are connected to, or to user devices 412a via subscriber units. In response to receiving the grants, subscriber units and/or user devices 412a send buffer status reports (BSRs) to base station 404. A BSR provides the serving cell with information about the amount of data in the uplink buffers available for transmission. In response, base station 404 sends additional grants to the subscriber units and user devices 412a. The subscriber units and user devices 412a can now upload uplink data to base station 404. However, sending SRs, grants, and BSRs adds to scheduling overhead and increases uplink latency.

Each grant (sometimes referred to as an "uplink grant") includes specific physical control channel information provided by base station 404 to subscriber units and/or user devices 412a, permitting the subscriber units and/or user devices 412a to upload the portion of the uplink data. The grant includes downlink control information (DCI) format 0 (control information regarding uplink data transmission). Information carried by the grant includes Resource Allocation information and modulation coding scheme (MCS) information. The subscriber units and/or user devices 412a upload the portion of the uplink data using resource blocks (RBs) and the MCS information specified by the DCI format 0 information.

While a conventional uplink grant permits a user device to upload the portion of the uplink data in response to receiving a service request from the user device (adding to scheduling overhead and uplink latency), a blind grant (e.g., blind grant 420) proactively enables user devices 412b to indefinitely upload data without pausing to send a service request for each portion of the uplink data. Blind grants (also referred to as "blind uplink grants") therefore obviate the need for each user device to submit multiple requests for resources. For upload-heavy applications, such as augmented-reality applications, base station 404 initiates an uplink prescheduling session for user devices 412b associated with a mid subscription tier (e.g., Tier 2). Tier 2 is higher than Tier 1. An example head-mounted display with wireless augmented-reality/virtual-reality connectivity 104-7 is illustrated and described in more detail with reference to FIG. 1. Base station 404 receive one or more requests for uplink prescheduling of uplink data from user devices 412b and/or subscriber units connected to user devices 412b. Base station 404 can receive the requests for uplink prescheduling directly from user devices 412b, directly from subscriber units, or from user devices 412b via subscriber units. In some implementations, a request specifies a quality of service indicator. The quality of service indicator is described in more detail with reference to FIG. 6.

In a low-load scenario, base station 404 sends blind grants (e.g., blind grants 420) in response to the subscriber units and/or user devices 412b. The blind grants provide proactive resource allocation by the base station to user devices connected to the subscriber units. A frequency of transmitting the blind grants can be based on the quality of service indicator and/or a network slice specified by a request from the fixed wires access network. Networking slicing and an example Network Slice Selection Function (NSSF) 226 are illustrated and described in more detail with reference to FIG. 2. The blind grants obviate the need for service requests and buffer status reports. Base station 404 receives uplink data 424 from the subscriber units connected to user devices 412b based on the blind grants. Base station 404 sends the uplink data to a backhaul of the fixed wireless access network. As a result of the prescheduling, an uplink latency experienced by at least one of user devices 412b is less than a threshold latency.

Similarly, base station 404 transmits blind grants to user devices 412c and/or subscriber units connected to user devices 412c. For example, the blind grants can be sent responsive to a determination that an application running on at least one of user devices 412c requires less than the threshold latency. User devices 412c can be augmented-reality devices requiring lower uplink latencies. Augmented-reality devices include heads up displays, holographic displays, smart glasses, and handheld/smartphone-based devices. In some scenarios, at least one of user devices 412c is executing an extended-reality application. The uplink data from user devices 412c can include biometric data captured. User devices 412c and/or the subscriber units connected to user devices 412c are associated with a higher subscription tier (e.g., Tier 3). Tier 3 is higher than Tier 2. Performing uplink prescheduling obviates transmitting, by user devices 412c, multiple service requests for the blind grants. In response, the subscriber units connected to user devices 412c send uplink data to base station 404. The uplink latency experienced by user devices 412c is in accordance with the quality of service indicator and is specified by the Tier 3 plan. In some implementations, a bandwidth of receiving uplink data from user devices 412c is greater than a threshold bandwidth specified by subscription Tier 3. A network speed observed by user devices 412c is greater than a threshold network speed specified by Tier 3.

In a high-load scenario 428, base station 404 determines presence of congestion on the PUSCH of the fixed wireless access network. In response to determining the presence of congestion, base station 404 determines that user devices 412c and/or subscriber units connected to user devices 412c are associated with subscription Tier 3, which specifies the threshold latency. In response to determining that user devices 412c and/or subscriber units connected to user devices 412c are associated with the Tier 3 plan, base station 404 continues transmitting blind grants to user devices 412c and/or subscriber units connected to user devices 412c. Base station 404 terminates transmitting blind grants subscriber units connected to user devices 412b devices because the subscriber units are associated with subscription Tier 2, which is lower than Tier 3.

In some examples, base station 404 determines that the uplink data from user devices 412c has exceeded a data cap specified by subscription Tier 3. In response to determining that the uplink data has exceeded the data cap, base station 404 terminates transmitting blind grants to subscriber units connected to user devices 412c. Base station 404 can determine that the uplink data has exceeded the data cap using a 5G core (5GC) policy control function (PCF) that monitors policy rules for control plane functions. Base station 404 terminates the uplink prescheduling session.

Figure 5:
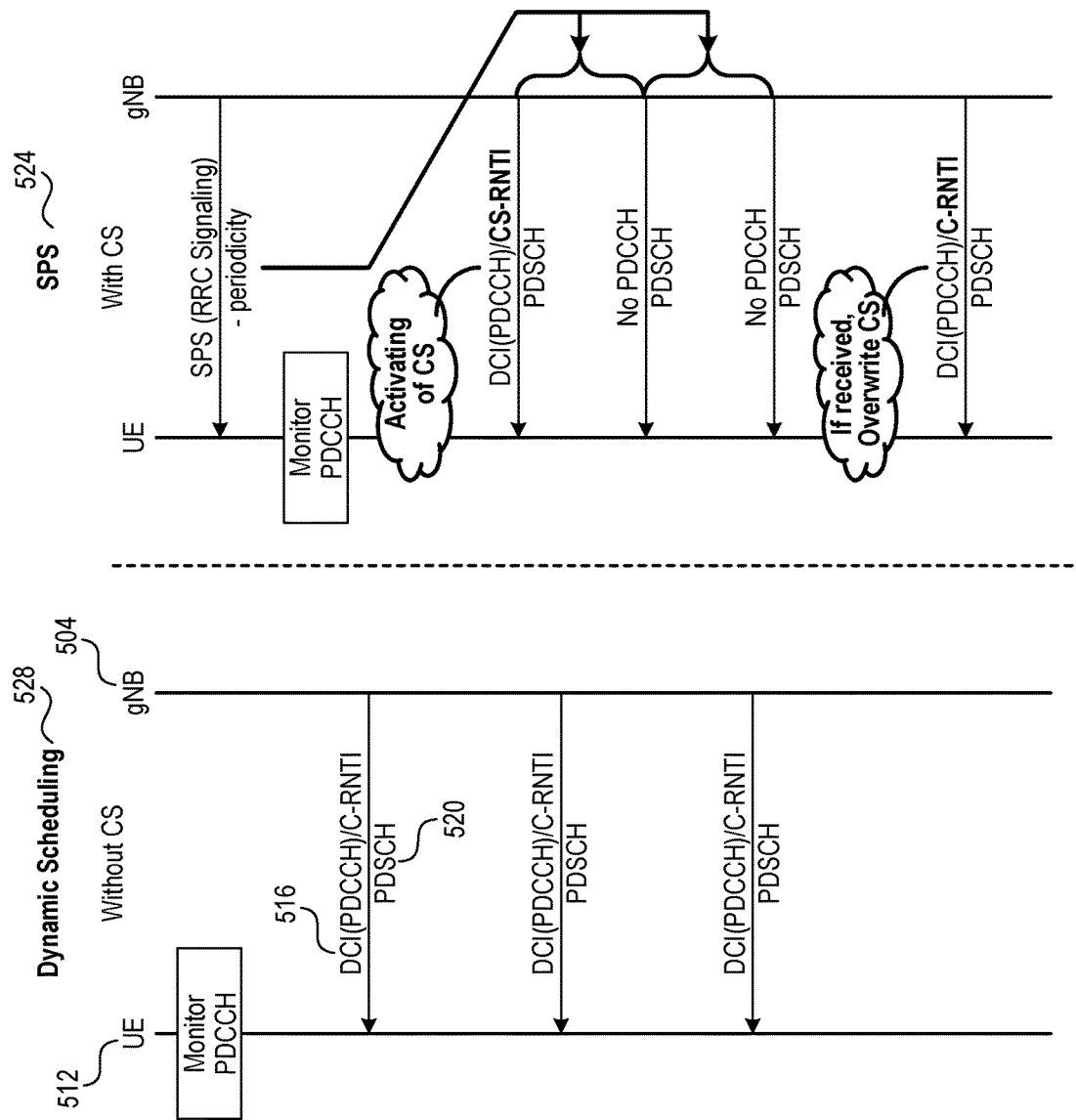
FIG. 5 is a drawing that illustrates an example flow for downlink prescheduling in fixed wireless access networks.

FIG. 5 is a drawing that illustrates an example flow for downlink prescheduling in fixed wireless access networks. In some implementations, the flow is performed by base station 504, which is similar to or the same as base station 304 illustrated and described in more detail with reference to FIG. 3. Base station 504 flexibly reconfigures downlink connectivity for a subscriber unit and user device 512 connected to a fixed wireless access network. User device 512 and the subscriber unit are the same as or similar to user devices 312 and subscriber units 324 illustrated and described in more detail with reference to FIG. 3. An example fixed wireless access network 308 is illustrated and described in more detail with reference to FIG. 3. Steps of the flow can also be performed by elements of the 5G core illustrated and described in more detail with reference to FIG. 2 or by the computer system 900 illustrated and described in more detail with reference to FIG. 9. Likewise, implementations of the flow can include different and/or additional steps, or perform the steps in different orders.

Base station 504 receives a request for downlink prescheduling of downlink data from the subscriber unit connected to the fixed wireless access network. In some implementations, the request specifies a quality of service indicator that specifies a threshold latency. The quality of service indicator is described in more detail with reference to FIG. 6. The downlink prescheduling is to reduce downlink latencies and increase downlink bandwidths when the subscriber unit is executing download-heavy applications, such as video streaming or virtual-reality applications. Base station 504 determines whether the fixed wireless access network is configured for semi persistent scheduling (SPS) 524. SPS refers to a transmission mode in which base station 504 allocates at least a part of network resources to user device 512 semi-statically over a time interval.

Base station 504 configures the fixed wireless access network to implement dynamic scheduling 528 of the downlink data. In some implementations, the fixed wireless access network implements dynamic scheduling by sending a downlink control information (DCI) scheduling grant 516 per PDSCH message 520 transmitted to the subscriber unit. Dynamic scheduling 528 reduces latencies for large data downloads. For example, user device 512 is executing a virtual-reality application or an online gaming application. Base station 504 transmits the downlink data to the subscriber unit using dynamic scheduling. As a result, a downlink latency experienced by user device 512 is less than the threshold latency. For example, the threshold downlink latency is 10 ms, 20 ms, or 30 ms. The threshold downlink latency can be specified by a user's subscription tier. In an example scenario, user device 512 and the subscriber unit are associated with a higher subscription Tier 2. Base station 504 determines presence of PDSCH congestion in the fixed wireless access network. In response to determining the presence of PDSCH congestion, base station 504 determines that the subscriber unit connected to user device 512 are associated with Tier 2, which specifies the threshold latency. Thus dynamic scheduling is continued for the subscriber unit.

In an example scenario, subscription Tier 2 is higher than another subscription Tier 1. On determining the presence of PDSCH congestion, base station 504 terminates dynamic scheduling for at least one other subscriber unit associated with subscription Tier 1. In some implementations, base station 504 determines that the downlink data from user device 512 has exceeded a data cap specified by subscription Tier 2, using a 5GC PCF that monitors policy rules for control plane functions. As a result, dynamic scheduling is terminated for the subscriber unit. The control plane functions can include network slicing, roaming and mobility management. An example PCF 212 is illustrated and described in more detail with reference to FIG. 2. Networking slicing and an example Network Slice Selection Function (NSSF) 226 are illustrated and described in more detail with reference to FIG. 2.

Figure 6:
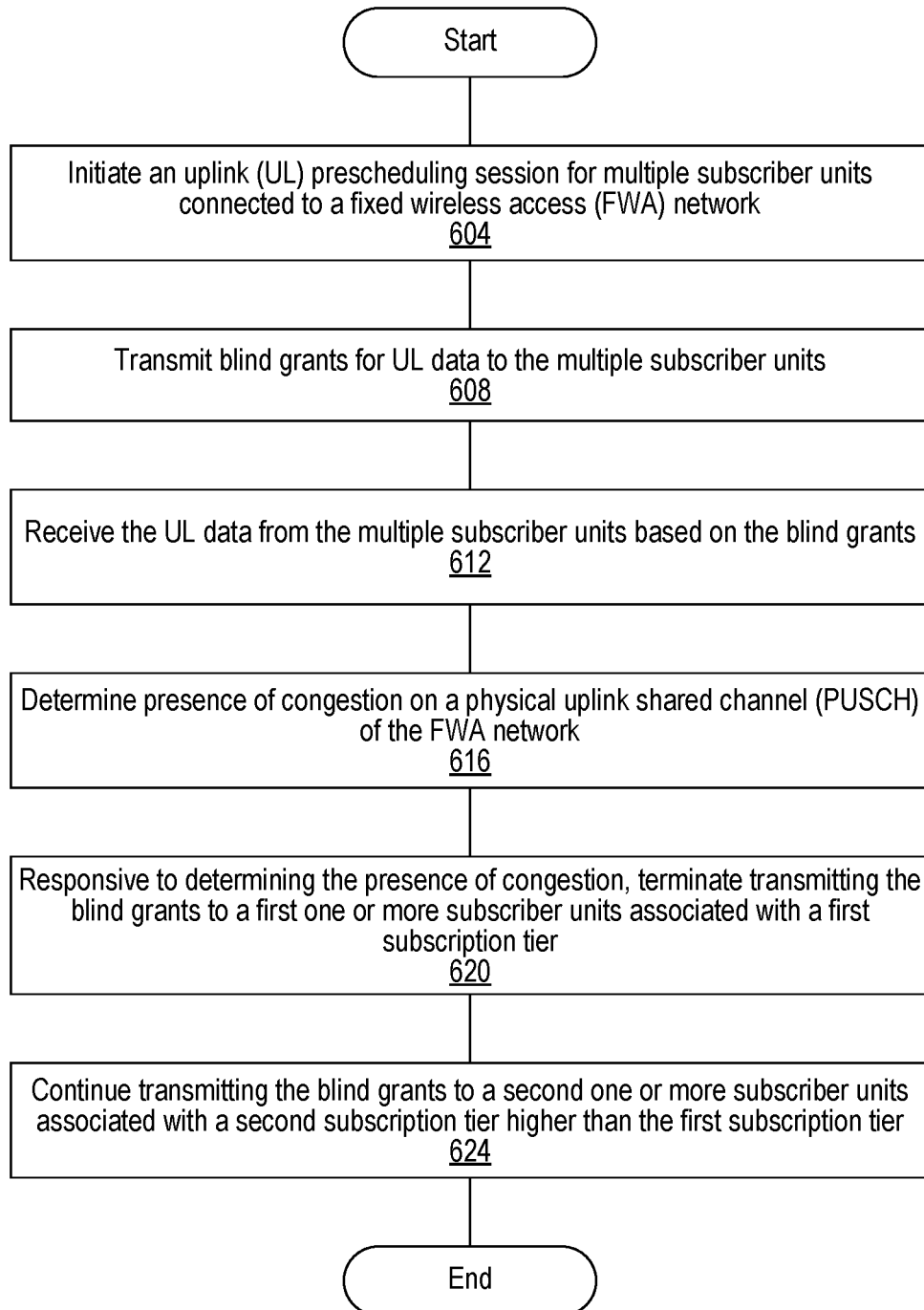
FIG. 6 is a flowchart that illustrates an example process for uplink prescheduling in fixed wireless access networks.

FIG. 6 is a flowchart that illustrates an example process for uplink prescheduling in fixed wireless access networks. In some implementations, the process is performed by a base station, e.g., base station 304 illustrated and described in more detail with reference to FIG. 3. Steps of the process can also be performed by elements of the 5G core illustrated and described in more detail with reference to FIG. 2 or by the computer system 900 illustrated and described in more detail with reference to FIG. 9. Likewise, implementations of the process can include different and/or additional steps, or perform the steps in different orders.

In act 604, a base station initiates an uplink prescheduling session for multiple subscriber units connected to a fixed wireless access network. The subscriber units and fixed wireless access network are the same as or similar to subscriber units 324a, 324b and fixed wireless access network 308 illustrated and described in more detail with reference to FIG. 3. In some example scenarios, the uplink prescheduling session is initiated for a network slice of the fixed wireless access network. The uplink prescheduling session can be initiated in response to a request from the fixed wireless access network specifying the network slice ID. A network slice refers to an architecture that enables the multiplexing of virtualized and independent logical networks on the same physical network infrastructure. Each network slice is an isolated end-to-end network tailored to fulfil diverse requirements requested by a particular application. Networking slicing and an example Network Slice Selection Function (NSSF) 226 are illustrated and described in more detail with reference to FIG. 2.

In act 608, the base station transmits blind grants for uplink data to the multiple subscriber units. An example blind grant 420 is illustrated and described in more detail with reference to FIG. 4. The blind grants provide proactive resource allocation by the base station to user devices connected to the subscriber units. Example user devices 312a, 312b are illustrated and described in more detail with reference to FIG. 3. In some scenarios, at least one user device connected to a subscriber unit of the multiple subscriber units is executing an augmented-reality application, and the uplink data includes video or biometric data captured by the at least one user device. An example head-mounted display with wireless augmented-reality/virtual-reality connectivity 104-7 is illustrated and described in more detail with reference to FIG. 1. In other scenarios, at least one user device connected to a subscriber unit of the multiple subscriber units is executing an online gaming application, and the uplink data includes voice data transmitted by the at least one user device.

In act 612, the base station receives the uplink data from the multiple subscriber units based on the blind grants. In some implementations, the uplink prescheduling session is based on a quality of service indicator, and a frequency of transmitting blind grants is based on the quality of service indicator. For example, the uplink data is received from the multiple subscriber units in accordance with the quality of service indicator associated with the uplink prescheduling session. The indicator corresponds to a set of quality of service characteristics that include guaranteed and maximum bitrates, priority levels, and limits on latency, jitter, and error rate. A bandwidth of receiving the uplink data from the multiple subscriber units can be greater than a threshold bandwidth specified by a particular subscription tier (e.g., Tier 2) associated with the multiple subscriber units.

In act 616, the base station determines presence of congestion on a PUSCH of the fixed wireless access network. In act 620, in response to determining the presence of congestion, the base station terminates transmitting blind grants to a first one or more subscriber units of the multiple subscriber units. The first one or more subscriber units is associated with a first subscription tier, e.g., Tier 1 having a lower priority.

In act 624, the base station continues transmitting blind grants to a second one or more subscriber units of the multiple subscriber units. The second one or more subscriber units is associated with the second subscription tier (Tier 2), which is higher than the first subscription tier. Tier 2 has a higher priority than Tier 1. In some implementations, the base station determines that the uplink data has exceeded a data cap associated with subscription Tier 2. In response to determining that the uplink data has exceeded or reached the data cap, the uplink prescheduling session is terminated.

Figure 7:
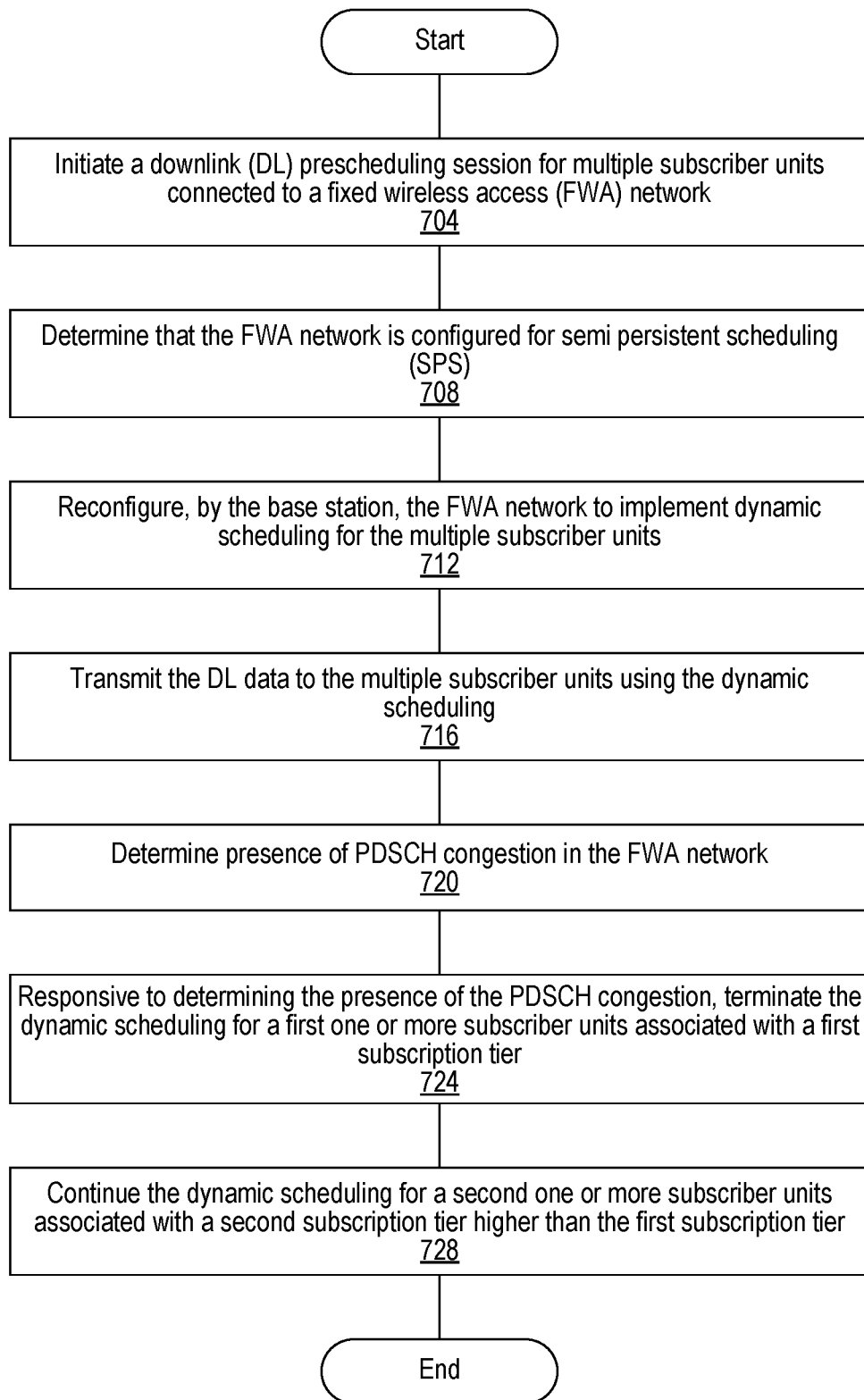
FIG. 7 is a flowchart that illustrates an example process for downlink prescheduling in fixed wireless access networks.

FIG. 7 is a flowchart that illustrates an example process for downlink prescheduling in fixed wireless access networks. In some implementations, the process is performed by a base station, e.g., base station 304 illustrated and described in more detail with reference to FIG. 3. Steps of the process can also be performed by elements of the 5G core illustrated and described in more detail with reference to FIG. 2 or by the computer system 900 illustrated and described in more detail with reference to FIG. 9. Likewise, implementations of the process can include different and/or additional steps, or perform the steps in different orders.

In act 704, a base station initiates a downlink prescheduling session for multiple subscriber units connected to a fixed wireless access network. The subscriber units and fixed wireless access network are the same as or similar to subscriber units 324a, 324b and fixed wireless access network 308 illustrated and described in more detail with reference to FIG. 3. For example, downlink prescheduling is initiated for multiple virtual-reality devices connected to the multiple subscriber units. At least one of the multiple virtual-reality devices can be executing an extended-reality application. Virtual-reality devices can include headsets or sensory accessories such as controllers, hand trackers, treadmills, or 3D cameras. At least one of the multiple virtual-reality devices can be a head-mounted display. For example 35, initiating the downlink prescheduling session is performed in response to determining that an application running on at least one of the multiple virtual-reality devices requires at least a threshold bandwidth. The downlink prescheduling session can be initiated for a network slice of the fixed wireless access network. The network slice is used by the multiple subscriber units. Networking slicing and an example Network Slice Selection Function (NSSF) 226 are illustrated and described in more detail with reference to FIG. 2. Initiating the downlink prescheduling session obviates the need for the multiple virtual-reality devices to send multiple service requests for downloading downlink data.

In act 708, the base station determines that the fixed wireless access network is configured for semi persistent scheduling. Semi persistent scheduling is illustrated and described in more detail with reference to FIG. 5. In act 712, in response to determining that the fixed wireless access network is configured for semi persistent scheduling, the base station reconfigures the fixed wireless access network to implement dynamic scheduling for downlink data of the multiple subscriber units. For example, dynamic scheduling is implemented for data downloads by the multiple virtual-reality devices. Dynamic scheduling is illustrated and described in more detail with reference to FIG. 5. For dynamic scheduling, a DCI scheduling grant is sent per PDSCH message transmitted by the base station to the multiple subscriber units.

In act 716, the base station transmits downlink data from a backhaul of the fixed wireless access network to the multiple subscriber units using dynamic scheduling. For example, the downlink data includes computer-generated three-dimensional (3D) interactive visualizations. Downlink prescheduling is performed when user devices connected to the multiple subscriber units are executing download-heavy applications. In some examples, the downlink data is sent from a backhaul of the fixed wireless access network to the multiple virtual-reality devices. In other examples, at least one user device connected to a subscriber unit of the multiple subscriber units is executing a video streaming application. Continuing the example, the downlink data includes video streamed by the video streaming application. Example user devices 312 are illustrated and described in more detail with reference to FIG. 3.

In act 720, the base station determines presence of PDSCH congestion in the fixed wireless access network. For example, the base station determines the presence of PDSCH congestion by evaluating whether the ratio of scheduled or utilized physical resource blocks (PRBs) to a total number of available PRBs is greater than a threshold ratio. The threshold ratio can be defined by the network, the base station, or an operator. For example, when 70% of the total number of available PRBs are scheduled or utilized, PDSCH congestion is flagged. The presence of PUSCH congestion is determined similarly.

In act 724, in response to determining the presence of PDSCH congestion, dynamic scheduling for a first one or more subscriber units of the multiple subscriber units is terminated. The first one or more subscriber units is associated with a first subscription tier (e.g., Tier 1). For example, dynamic scheduling is ended for subscriber units connected to a first one or more virtual-reality devices of the multiple virtual-reality devices.

In act 728, dynamic scheduling is continued for a second one or more subscriber units of the multiple subscriber units. The second one or more subscriber units is associated with a second subscription tier (e.g., Tier 2) higher than the first subscription tier. For example, dynamic scheduling is continued for subscriber units connected to a second one or more virtual-reality devices of the multiple virtual-reality devices. In some implementations, the downlink prescheduling session is initiated in response to a request from at least one subscriber unit of the multiple subscriber units. The request can specify a quality of service indicator associated with a particular subscription tier, e.g., Tier 2. The quality of service indicator is described in more detail with reference to FIG. 6. For example, a bandwidth of transmitting the downlink data to the multiple subscriber units bandwidth is greater than a threshold bandwidth specified by subscription Tier 2. The base station can determine that the downlink data has reached a data cap specified by subscription Tier 2. In response to determining that the downlink data has reached or exceeded the data cap, downlink prescheduling is terminated for the second one or more subscriber units.

Figure 8:
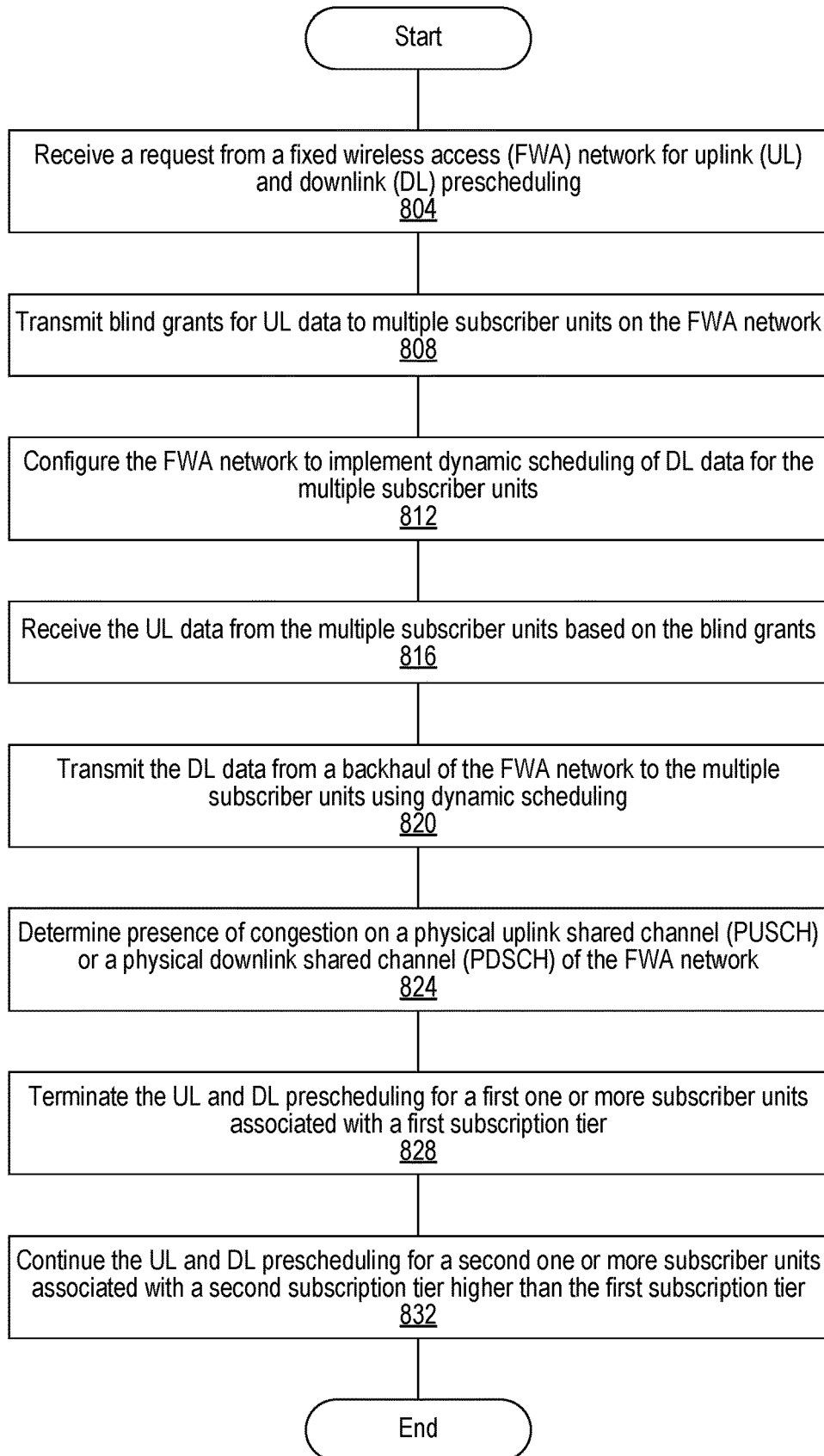
FIG. 8 is a flowchart that illustrates an example process for uplink and downlink prescheduling in fixed wireless access networks.

FIG. 8 is a flowchart that illustrates an example process for uplink and downlink prescheduling in fixed wireless access networks. The process is especially useful when user devices connected to a fixed wireless access network are executing low-latency applications such as online gaming. In some implementations, the process is performed by a base station, e.g., base station 304 illustrated and described in more detail with reference to FIG. 3. Steps of the process can also be performed by elements of the 5G core illustrated and described in more detail with reference to FIG. 2 or by the computer system 900 illustrated and described in more detail with reference to FIG. 9. Likewise, implementations of the process can include different and/or additional steps, or perform the steps in different orders.

In act 804, a base station receives a request from a fixed wireless access network for uplink and downlink prescheduling, e.g., to reduce network access latency by proactively allocating resources. An example fixed wireless access network 308 is illustrated and described in more detail with reference to FIG. 3. The request can be sent to the base station from a network component such as a gateway or router, a subscriber unit connected to the fixed wireless access network, or a user device connected to the fixed wireless access network. Example user devices 312 and example subscriber units 324 are illustrated and described in more detail with reference to FIG. 3.

In act 808, the base station transmits blind grants for uplink data to multiple subscriber units on the fixed wireless access network. Blind grants are illustrated and described in more detail with reference to FIG. 3. In some implementations, the blind grants are transmitted to a first one or more subscriber units on the fixed wireless access network that are associated with a first subscription tier (e.g., Tier 1) that specifies a threshold uplink bandwidth and a first data cap. For example, the first one or more subscriber units are executing an upload-heavy application, such as augmented reality. The first data cap can be 350 Gigabyte (GB), 750 GB, 1.2 Terabyte (TB), etc. An uplink bandwidth of the data upload from the first one or more subscriber units based on the blind grants would be at least the threshold uplink bandwidth. In some implementations, the fixed wireless access network operates in a non-standalone (NSA) 5G mode using a 4G long-term evolution (LTE) architecture and a 5G radio access network (RAN). NSA 5G mode refers to a solution for 5G networks where the network is supported by the existing 4G infrastructure. For example, user devices running Android 10™ or higher can support 5G NSA.

In act 812, the base station configures the fixed wireless access network to implement dynamic scheduling of downlink data for the multiple subscriber units. Dynamic scheduling is illustrated and described in more detail with reference to FIG. 5. In some implementations, the fixed wireless access network implements dynamic scheduling for data download by a second one or more subscriber units that are associated with a second subscription tier (e.g., Tier 2) that specifies a second data cap. For example, the second one or more subscriber units are executing a download-heavy application such as a virtual-reality application. The subscription Tier can specify a threshold downlink bandwidth, wherein a downlink bandwidth of the data downloaded is at least the threshold downlink bandwidth. The fixed wireless access network can operate in a standalone (SA) 5G mode using a 5G RAN and a cloud-native 5G core (5GC). Components of an example 5GC are illustrated and described in more detail with reference to FIG. 2. SA 5G implements a 5GC to manage connectivity, mobility and user authentication, as well as other essential management functions.

In act 816, the base station receives the uplink data from the multiple subscriber units based on the blind grants. For example, the fixed wireless access network is configured to support at least one user device executing a gaming or extended-reality application. The uplink data includes video captured by the at least one user device, and the downlink data includes computer-generated 3D interactive visualizations.

In act 820, the base station transmits the downlink data from a backhaul of the fixed wireless access network to the multiple subscriber units using dynamic scheduling. In some implementations, receiving the uplink data and transmitting the downlink data is in accordance with a quality of service indicator specified by the request for uplink and downlink prescheduling. The quality of service indicator is described in more detail with reference to FIG. 6. In act 824, the base station determines presence of congestion on a PUSCH or a PDSCH of the fixed wireless access network.

In act 828, in response to determining the presence of congestion, the base station terminates uplink and downlink prescheduling for the first one or more subscriber units of the multiple subscriber units. For example, the first one or more subscriber units is associated with a first subscription tier, e.g., Tier 1 having a lower priority. In some implementations, in response to determining that the data upload has met a first data cap, the base station terminates transmitting blind grants to the first one or more subscriber units. Data upload from the first one or more subscriber units proceeds at less than the threshold uplink bandwidth.

In act 832, the base station continues uplink and downlink prescheduling for a second one or more subscriber units of the multiple subscriber units. For example, the second one or more subscriber units is associated with a second subscription tier (e.g., Tier 2) higher than the first subscription tier. The base station can determine that an amount of the data downloaded is less than a second data cap and continue the data download using dynamic scheduling. In some implementations, the base station determines that the uplink and downlink data has exceeded a data cap specified by subscription Tier 2. In response to determining that the uplink and downlink data has exceeded the data cap, uplink and downlink prescheduling is terminated for the second one or more subscriber units.

Each subscription Tier can have a different data cap. For example, subscription Tier 1 specifies a first data cap. Subscription Tier 2 can specify a threshold latency, a threshold bandwidth, and a second data cap different from the first data cap. In some scenarios, subscriber units associated with upload-heavy applications can be on a subscription tier specifying a data cap of 350 GB, 750 GB, 1.2 TB, etc. Subscriber units associated with download-heavy applications can be on a subscription tier specifying a data cap of 500 GB, 1 TB, 1.5 TB, etc. Subscriber units associated with lower-latency applications can be on a subscription tier specifying a data cap of 400 GB, 1.2 TB, 2 TB, etc.

In implementations, a third one or more subscriber units on the fixed wireless access network are associated with a third subscription tier (e.g., Tier 3) specifying a threshold latency and a third data cap. For example, the fixed wireless access network is configured to implement dynamic scheduling for the third one or more subscriber units, where the subscription Tier 3 is higher than the subscription Tier 2. If the base station determines presence of congestion on a PDSCH of the fixed wireless access network, dynamic scheduling is terminated for the second one or more subscriber units.

Computer System

Figure 9:
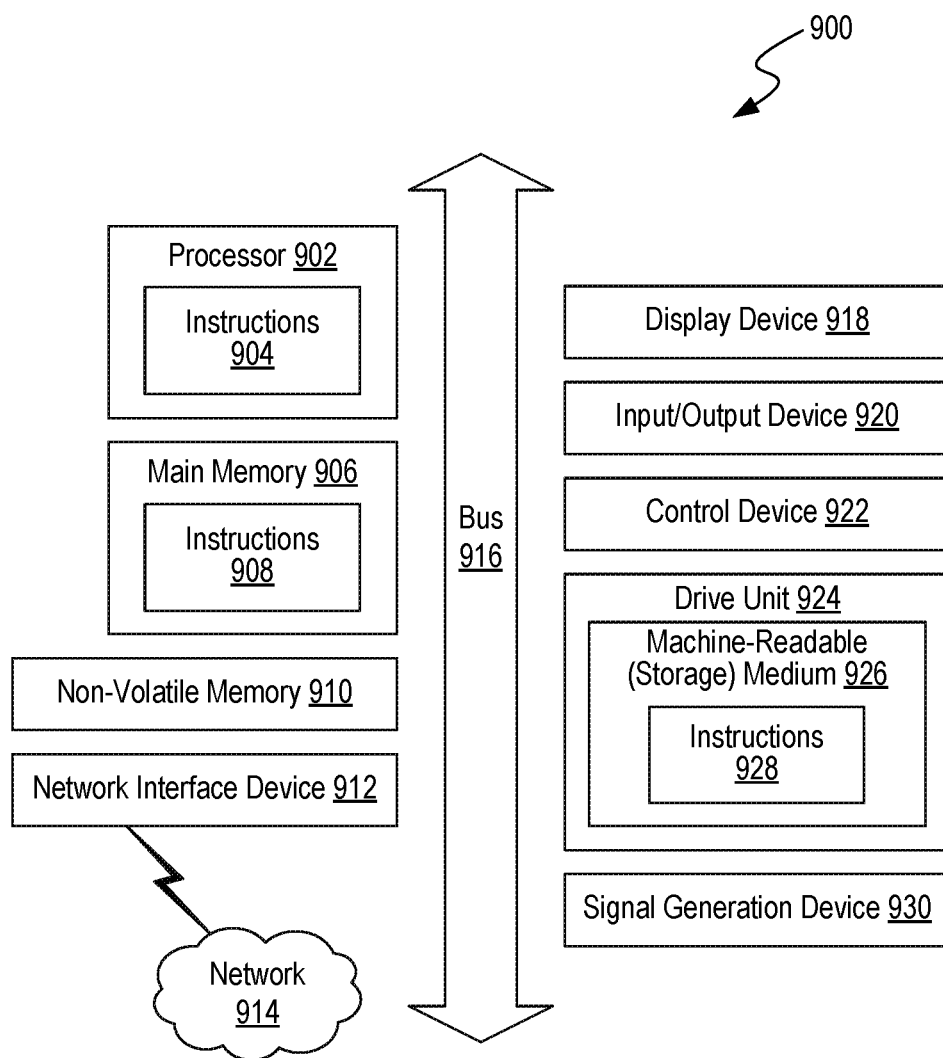
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), augmented-reality/virtual-reality systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of examples, certain implementations are presented below in certain example forms, but the applicant contemplates various aspects of an invention in other forms. For example, aspects of an example can be recited in a means-plus-function form or in other forms, such as being embodied in a computer-readable medium. An example intended to be interpreted as a mean-plus-function example will use the words "means for." However, the use of the term "for" in any other context is not intended to invoke a similar interpretation. The applicant reserves the right to pursue such additional example forms in either this application or in a continuing application.

I claim:

1. A system comprising:
   at least one hardware processor; and
   at least one non-transitory memory storing instructions, which, when executed by the at least one hardware processor, cause the system to:
     initiate, by a base station, an uplink prescheduling session for multiple subscriber units connected to a fixed wireless access network,
       wherein the uplink prescheduling session is initiated for a network slice of the fixed wireless access network;
     begin transmitting, by the base station, blind grants for uplink data to the multiple subscriber units;

begin receiving, by the base station, the uplink data from the multiple subscriber units based on the blind grants;

determine, by the base station, presence of congestion on a physical uplink shared channel (PUSCH) of the fixed wireless access network;

responsive to determining the presence of congestion,
terminate, by the base station, transmitting the blind grants to a first one or more subscriber units of the multiple subscriber units,
wherein the first one or more subscriber units is associated with a first subscription tier; and
continue, by the base station, transmitting the blind grants to a second one or more subscriber units of the multiple subscriber units,
wherein the second one or more subscriber units is associated with a second subscription tier higher than the first subscription tier;
determine, by the base station, that the uplink data has exceeded a data cap specified by the second subscription tier; and
responsive to determining that the uplink data has exceeded the data cap, terminate the uplink prescheduling session.

2. The system of claim 1, wherein the base station is a 5G gNodeB (gNB) implementing a software-defined radio.

3. The system of claim 1, wherein the uplink prescheduling session is based on a quality of service indicator, and wherein a frequency of transmitting blind grants is based on the quality of service indicator.

4. The system of claim 1, wherein a bandwidth of receiving the uplink data from the multiple subscriber units is greater than a threshold bandwidth specified by the second subscription tier.

5. The system of claim 1, wherein at least one user device connected to a subscriber unit of the multiple subscriber units is executing an augmented-reality application, and wherein the uplink data comprises video or biometric data captured by the at least one user device.

6. The system of claim 1, wherein receiving the uplink data from the multiple subscriber units is in accordance with a quality of service indicator associated with the uplink prescheduling session.

7. The system of claim 1, wherein at least one user device connected to a subscriber unit of the multiple subscriber units is executing an online gaming application, and wherein the uplink data comprises voice data transmitted by the at least one user device.

8. At least one non-transitory computer-readable storage medium storing instructions, which, when executed by at least one data processor of a system, cause the system to:
receive a request for uplink prescheduling of uplink data from at least one subscriber unit of multiple subscriber units connected to a fixed wireless access network, wherein the request specifies a quality of service indicator;
begin transmitting blind grants for the uplink data to the multiple subscriber units, wherein a frequency of transmitting the blind grants is based on the quality of service indicator;
begin to receive the uplink data from the multiple subscriber units based on the blind grants,
wherein an uplink latency experienced by at least one user device connected to a subscriber unit of the multiple subscriber units is less than a threshold latency;

determine, by the base station, presence of congestion on a physical uplink shared channel (PUSCH) of the fixed wireless access network; and responsive to determining the presence of congestion,
determine that the multiple subscriber units are associated with a particular subscription tier specifying the threshold latency; and
responsive to determining that the multiple subscriber units are associated with the particular subscription tier, continue transmitting blind grants to the multiple subscriber units.

9. The non-transitory computer-readable storage medium of claim 8, wherein the instructions cause the system to:
begin to transmit, by the base station, the uplink data to a backhaul of the fixed wireless access network.

10. The non-transitory computer-readable storage medium of claim 8, wherein the instructions cause the system to:
determine that the uplink data has exceeded a data cap specified by the particular subscription tier; and
responsive to determining that the uplink data has exceeded the data cap, terminate transmitting blind grants to the at least one subscriber unit.

11. The non-transitory computer-readable storage medium of claim 10, wherein the instructions cause the system to determine that the uplink data has exceeded the data cap using a 5G core (5GC) policy control function (PCF) that monitors policy rules for control plane functions.

12. The non-transitory computer-readable storage medium of claim 8, wherein the instructions cause the system to:
transmit the blind grants responsive to a determination that an application running on the at least one user device requires less than the threshold latency.

13. The non-transitory computer-readable storage medium of claim 8, wherein the uplink latency experienced by the at least one user device is in accordance with the quality of service indicator.

14. The non-transitory computer-readable storage medium of claim 8, wherein a frequency of blind grants transmitted by the base station is based on the network slice.

15. A method comprising:
initiating, by at least one hardware processor, an uplink prescheduling session for multiple augmented-reality devices connected to a fixed wireless access network;
beginning to transmit, to the multiple augmented-reality devices, blind grants for uplink data comprising biometric data captured by the multiple augmented-reality devices;
beginning to receive, from the multiple augmented-reality devices, the uplink data based on the blind grants;
determining presence of congestion on a physical uplink shared channel (PUSCH) of the fixed wireless access network; and
responsive to determining the presence of congestion,
terminating transmitting blind grants to a first one or more subscriber units connected to a first one or more augmented-reality devices of the multiple augmented-reality devices,
wherein the first one or more subscriber units is associated with a first subscription tier; and
continuing transmitting blind grants to a second one or more subscriber units connected to a second one or more augmented-reality devices of the multiple augmented-reality devices, wherein the second one or more subscriber units is associated with a second subscription tier higher than the first subscription tier.

16. The method of claim 15, comprising:

determining that the second one or more subscriber units has met a data cap specified by the second subscription tier using a 5G core (5GC) policy control function (PCF) that monitors policy rules for control plane functions; and terminating the uplink prescheduling session.

17. The method of claim 15, wherein initiating the uplink prescheduling session obviates transmitting, by the multiple augmented-reality devices, multiple service requests for the blind grants.

18. The method of claim 15, wherein a bandwidth of receiving the uplink data is greater than a threshold bandwidth specified by the second subscription tier.

19. The method of claim 15, wherein a network speed observed by the second one or more augmented-reality devices is greater than a threshold network speed.

20. The method of claim 15, wherein at least one of the multiple augmented-reality devices is executing an extended-reality application.

* * * * *